Feb. 13, 1962  W. H. SCHNACKE  3,021,182
SEALED BEARING AND SHAFT ASSEMBLY
Filed May 29, 1959  2 Sheets-Sheet 1
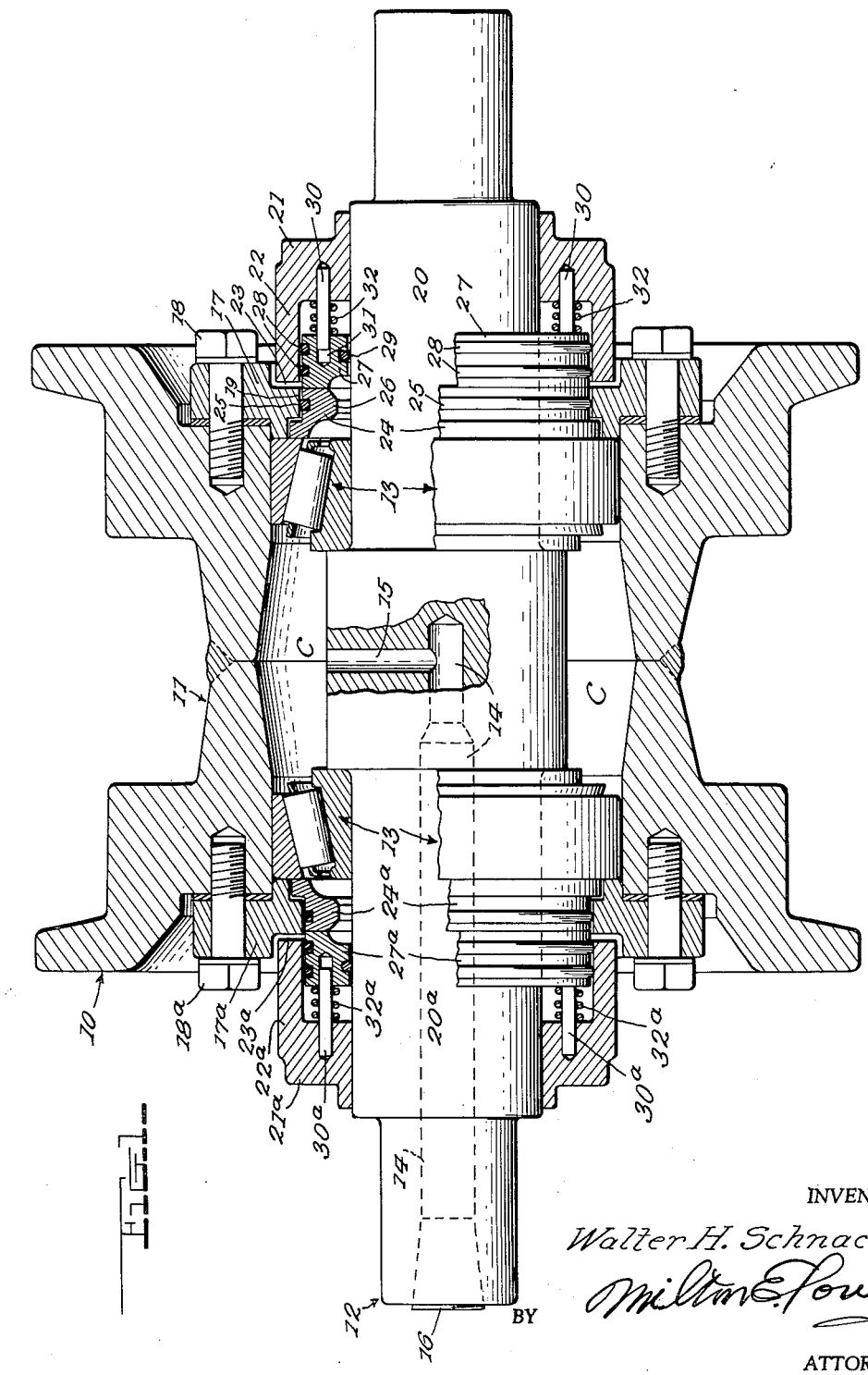
INVENTOR
Walter H. Schnacke
BY Milton E. Powry
ATTORNEY Feb. 13, 1962 W. H. SCHNACKE 3,021,182
SEALED BEARING AND SHAFT ASSEMBLY
Filed May 29, 1959 2 Sheets-Sheet 2
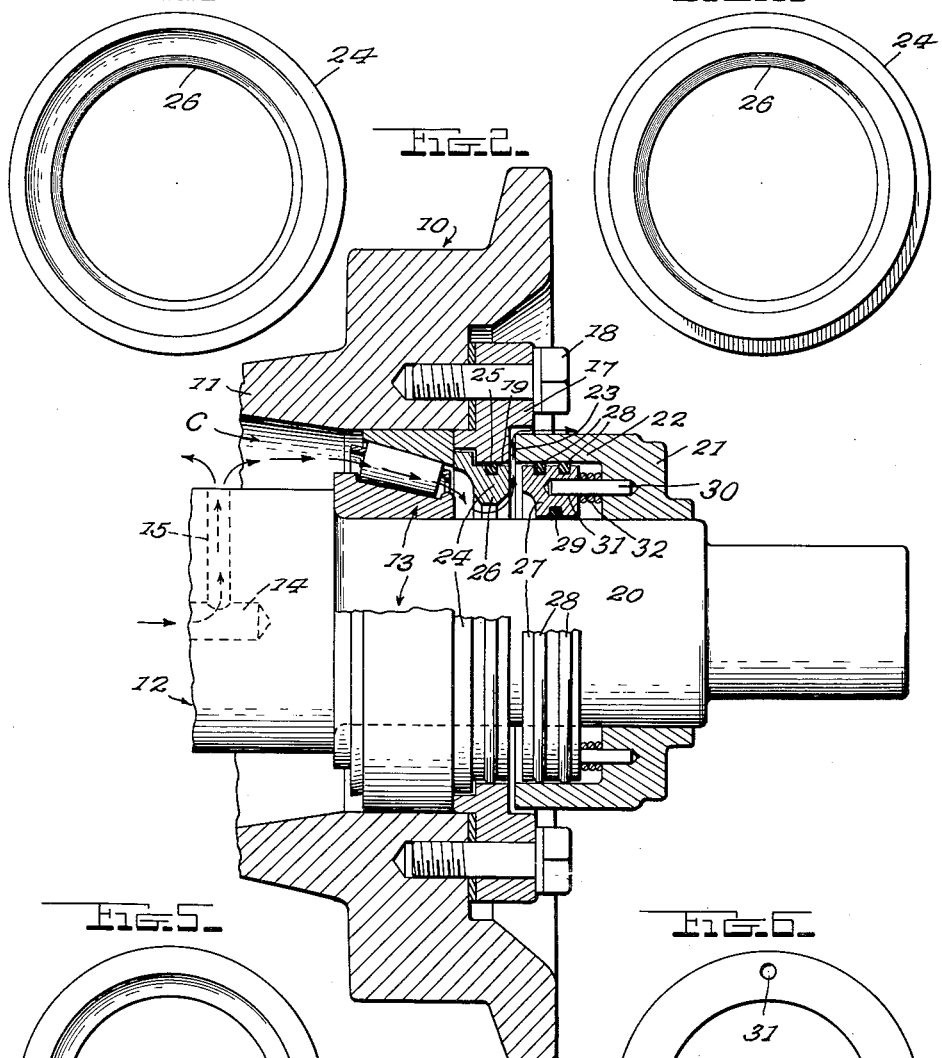
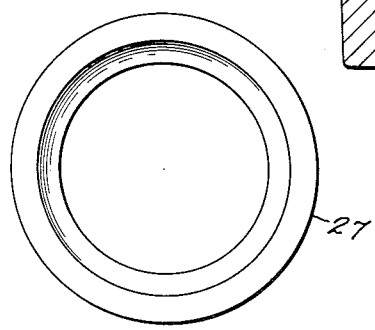
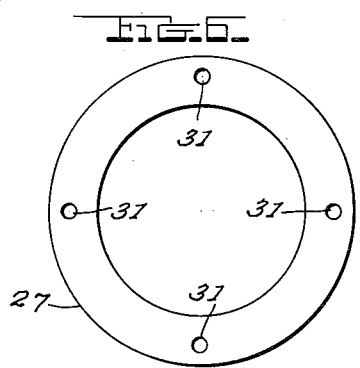
INVENTOR
Walter H. Schnacke
BY
ATTORNEY

United States Patent Office 3,021,182
Patented Feb. 13, 1962

3,021,182
SEALED BEARING AND SHAFT ASSEMBLY
Walter H. Schnacke, 1016 E. Columbia St.,
Evansville, Ind.
Filed May 29, 1959, Ser. No. 816,810
7 Claims. (Cl. 308—187)

This invention relates to sealed bearing and shaft assemblies and more particularly to such assemblies as used for mounting the track rollers of crawler type tractors, bulldozers, excavators and the like.

In crawler type tractors, bulldozers, and the like, a serious problem exists with respect to lubrication of shafts and bearings because of use of the machines under conditions of waste, mud and climate wherein the bearing seals do not function properly and permit excessive wear of working parts because of a lack of lubrication properly applied and because of failure due to the entrance of foreign materials which act as abrasive compounds resulting in the undue wear. It is difficult and sometimes almost impossible to properly lubricate the shafts and bearings under working conditions as they work in mud, water, sand and whatever type of land the machine itself happens to be working on, and which mud, water, sand, etc. surround the working parts. Generally there is a threaded plug which is removable for the injection of grease or oil which goes to the bearing and seal at one end of the shaft and then travels to the bearing and seal at the other end of the shaft, and excess grease can only find relief through a relief hole which frequently becomes entirely plugged with old grease and dirt. Thus there is no reliable way to refill the grease cavity with completely new grease, and complete change of grease is almost impossible due to the structure of the parts; and even the seals can be forced and broken by the grease pressure when the relief hole is plugged or stopped up. Moreover, the sealing surfaces of the seals of prior assemblies cannot be relubricated without "tearing down" the assembly and as this is a lengthy, expensive, and arduous procedure, it is seldom done. This neglect also is a factor in shortening the life of the seals, admitting foreign matter, and eventually causing break-down of equipment.

The present invention is designed to overcome such prior problems by providing sealing means so constructed and arranged as to act as pressure relief means for allowing the extrusion of old grease from the assembly while new grease is being injected under pressure, making it possible to completely change the grease in the assembly, thereby purging it of old grease and any foreign matter which may have entered.

The sealing means includes an inner sealing ring, and an outer sealing ring spring-held against said inner ring; and the invention aims to provide such a structure that the pressure created by the injection of new grease, will force the outer ring from contact with the inner ring, with no danger of damaging the seal and will thus permit the extrusion of old grease between the two rings. When all old grease has thus been driven out, it will be followed by some of the fresh grease and thus the coacting faces of the two sealing rings will be relubricated for smooth sealing contact with each other as soon as the injection of new grease is stopped.

With the above and other objects in view that will become apparent as the nature of the invention is better understood, the same consists in the novel form, combination and arrangement of parts hereinafter more fully described, shown in the accompanying drawings, and particularly claimed.

In the drawings:

FIG. 1 is a sectional view, partly in elevation, showing an assembly embodying the invention;

FIG. 2 is a fragmentary view duplicating the right hand portion of FIG. 1 but showing the manner in which the sealing means opens to extrude old grease while new grease is being injected;

FIG. 3 and 4 are respectively an inner side view and an outer side view of one of the inner sealing rings; and FIGS. 5 and 6 are respectively an inner side view and an outer side view of one of the outer sealing rings.

The construction shown in the drawings will be rather specifically described, but it is to be understood that variations may be made.

A track roller 10 is shown having a sleeve-like hub 11 surrounding and radially spaced from a shaft 12 which is to be non-rotatably secured as usual to the frame of a machine. Roller bearings 13 are disposed within the ends of the hub 11 and rotatably mount the track roller 10 on the shaft 12. This shaft has an axial passage 14 and a communicating radial passage 15, for conducting grease under pressure into the chamber C defined by the hub 11, shaft 12 and bearings 13. The outer end of the passage 14 is normally closed by a plug 16.

A circular bearing retainer 17 is secured by screws 18 to one end of the hub 11 and has an inner cylindrical surface 19 concentric with and radially spaced from one end portion 20 of the shaft 12.

A duplicate bearing retainer 17$^a$ is secured at 18$^a$ to the other end of the hub 11 and is related in the same manner with the other end portion 20$^a$ of the shaft 12.

An abutment collar 21 is secured around the end portion 20 of the shaft 12 in outwardly spaced relation with the bearing retainer 17. This abutment collar 21 has a cylindrical flange 22 concentric with and radially spaced from the end portion 20 of the shaft 12. This flange 22 extends toward the bearing retainer 17 but terminates in spaced relation with the latter to provide a grease discharge passage 23.

A duplicate abutment collar 21$^a$ is secured around the end portion 20$^a$ of the shaft 12 and is related in the same manner with said shaft and the bearing retainer 17$^a$.

An inner rotatable sealing ring 24 is disposed within the bearing retainer 17 and has an O-ring seal 25 contacting with the inner peripheral surface 19 of said retainer. The inner periphery 26 of the sealing ring 24 is radially spaced from the shaft end portion 20.

A duplicate sealing ring 24$^a$ is provided within the bearing retainer 17$^a$ and is related in the same manner with this retainer and the shaft end portion 20$^a$.

An outer, relatively stationary sealing ring 27 having a much smaller internal diameter than the inner sealing ring 24, is disposed within the confines of the cylindrical flange 22 and is in sealing contact with said inner sealing ring 24. The ring 27 has O-ring seals 28, at its outer periphery, engaging the inner surface of the flange 22. The ring 27 also has an O-ring seal 29, at its inner periphery, engaging the shaft end portion 20.

A duplicate outer, relatively stationary sealing ring 27$^a$ is related in the same manner with the sealing ring 24$^a$, the flange 22$^a$ of the abutment collar 21$^a$ and the shaft end portion 20$^a$.

The abutment collar 21 rigidly carries pins 30 which are spaced apart circumferentially of the shaft 12 and disposed within the confines of the flange 22. These pins are parallel with the shaft axis and have their inner ends slidably received in sockets 31 in the ring 27.

Duplicate pins 30$^a$ are related in the same manner with the abutment collar 21$^a$, its flange 22$^a$, the sealing ring 27$^a$ and the shaft 12.

Coiled compression springs 32 surround the pins 30, bear at their inner ends against the outer seal ring 27, and bear at their outer ends against the abutment collar 21, to yieldably hold said outer seal ring 27 against the inner seal ring 24.

Duplicate springs 32$^a$ surround the pins 30$^a$ and are related in the same manner with the abutment collar 21a and seal ring 27a.

The assembly is initially filled with grease by removing the plug 16 and connecting a grease gun or the like with the outer end of the passage 14. The injected grease fills the chamber C, passes uniformly through the roller bearings 13, passes between the shaft portions 20 and 20a and the inner seal rings 24 and 24a, and so thrusts against the outer seal rings 27 and 27a as to outwardly shift them from the inner rings 24 and 24a (see FIG. 2). This allows some grease to escape through the passages 23 and 23a, thereby lubricating the coacting surfaces of the seal rings and also giving notice that the assembly has been completely filled. The gun or the like is then detached and the plug 16 reinserted.

When re-lubricating the assembly, the pressure of the new grease being injected causes the old grease to force the outer seal rings 27 and 27a from the inner seal rings 24 and 24a, allowing extrusion of the old grease and any foreign matter which may have entered the assembly and assuring complete re-filling with the new grease. When some of the new grease follows the old and travels between the inner and outer seal rings, it re-lubricates the coacting surfaces of the rings. This re-lubrication of the seal rings, the driving out of foreign matter, and the thorough re-lubrication of all other parts, greatly increase the life of the assembly and assure maximum trouble-free operation.

From the foregoing, it will be seen that novel provision has been made for attaining the desired ends. Attention is again invited, however, to the possibility of making variations without departing from the spirit and scope of the invention as claimed.

I claim:

1. In a sealed bearing-and-shaft assembly having means for admitting grease under pressure; sealing means for the injected grease constructed and arranged to act without injury as pressure relief means for allowing the extrusion of old grease while new grease is being injected, said sealing means including an axially separable inner and an outer sealing ring having juxtaposed sealing and bearing surfaces, and spring means yieldably holding said outer ring in sealing contact with said inner ring, said outer ring having a portion of its inner side sufficiently exposed to the grease within the assembly so as to allow the increased pressure caused by injection of new grease to force said outer ring axially from contact with said inner ring, axially displacing said sealing and bearing surfaces and permitting used grease to be forced from between said sealing and bearing surfaces and carrying said used grease and foreign matter away from said bearing and shaft assembly, said assembly including a portion communicating with the exterior of said seals to permit the passage of used grease therefrom, said inner ring being of considerably greater internal diameter than said outer ring to provide an exposed pressure responsive portion at the said inner side of said outer ring and subject to the new grease pressure.

2. In a sealed bearing-and-shaft assembly having means for admitting grease under pressure; sealing means for the injected grease constructed and arranged to act without injury as pressure relief means for allowing the extrusion of old grease while new grease is being injected, said sealing means including an axially separable inner and an outer sealing ring having juxtaposed sealing and bearing surfaces, and spring means yieldably holding said outer ring in sealing contact with said inner ring, said outer ring having a portion of its inner side sufficiently exposed to the grease within the assembly as to allow the increased pressure caused by injection of new grease to force said outer ring axially from contact with said inner ring, axially displacing said sealing and bearing surfaces and permitting used grease to be forced from between said sealing and bearing surfaces and carrying said used grease and foreign matter away from said bearing and shaft assembly, said assembly including a portion communicating with the exterior of said seals to permit the passage of used grease therefrom, an abutment spaced outwardly from said outer seal ring, said abutment being provided with circumferentially spaced rigid pins parallel with the axis of the assembly, said outer ring having sockets slidably receiving the inner ends of said pins, said spring means consisting of coiled springs surrounding said pins respectively and bearing at their ends against said outer ring and said abutment respectively.

3. In an assembly in which a sleeve-like hub surrounds and is radially spaced from a fixed shaft; in which roller bearings are disposed within the ends of said hub and mount the latter upon said shaft; in which the ends of said shaft project beyond the ends of said hub; and in which a passage is provided for conducting grease under pressure into the chamber defined by said shaft, hub and roller bearings; at least one circular bearing retainer secured to one end of said hub and having an inner cylindrical surface concentric with and radially spaced from one end portion of said shaft; at least one abutment collar secured around said one end portion of said shaft in outwardly spaced relation with said one bearing retainer, said one abutment collar having a cylindrical flange concentric with and radially spaced from said one end portion of said shaft, said cylindrical flange extending toward said one bearing retainer and terminating in spaced relation therewith; at least one rotatable sealing ring with said one bearing retainer and having an outer peripheral seal contacting with said inner cylindrical surface of said one bearing retainer, the inner periphery of said one rotatable sealing ring being radially spaced from said one end portion of said shaft; at least one relatively stationary sealing ring surrounded by said cylindrical flange of said one abutment ring and in sealing contact with said one rotatable sealing ring, said one relatively stationary sealing ring having an inner peripheral seal in contact with said one end portion of said shaft; and spring means acting on said one relatively stationary sealing ring and reacting on said one abutment collar to normally hold said one relatively stationary sealing ring in sealing contact with said one rotatable sealing ring and to permit movement of said one relatively stationary sealing ring away from said one rotatable sealing ring under the pressure created by injection of new grease into the aforesaid chamber, said one stationary sealing ring having an inner surface exposed to grease under pressure to effect the movement of said one stationary sealing ring thereby allowing extrusion of old grease between said one bearing retainer and said cylindrical flange of said one abutment ring.

4. In an assembly in which a sleeve-like hub surrounds and is radially spaced from a fixed shaft; in which roller bearings are disposed within the ends of said hub and mount the latter upon said shaft; in which the ends of said shaft project beyond the ends of said hub; and in which a passage is provided for conducting grease under pressure into the chamber defined by said shaft, hub and roller bearing: one circular bearing retainer secured to one end of said hub and having an inner cylindrical surface concentric with and radially spaced from one end portion of said shaft; a duplicate bearing retainer secured to the other end of said hub and related in the same manner with the other end portion of said shaft; one abutment collar secured around said one end portion of said shaft in outwardly spaced relation with said one bearing retainer, said one abutment collar having a cylindrical flange concentric with and radially spaced from said one end portion of said shaft, said cylindrical flange extending toward said one bearing retainer and terminating in spaced relation therewith; a duplicate abutment collar secured around said other end portion of said shaft and related in the same manner with said shaft and said duplicate bearing retainer; one rotatable sealing ring with said one bearing retainer and having an outer peripheral seal contacting with said inner cylindrical surface of said one bearing retainer, the inner periphery of said one rotatable sealing ring being radially spaced from said one end portion of said shaft; a duplicate rotatable sealing ring within said duplicate bearing retainer and related in the same manner with this retainer and said other end portion of said shaft; one relatively stationary sealing ring surrounded by said cylindrical flange of said one abutment ring and in sealing contact with said one rotatable sealing ring, said one relatively stationary sealing ring having an inner peripheral seal in contact with said one end portion of said shaft; a duplicate relatively stationary sealing ring related in the same manner with said duplicate rotatable sealing ring, said duplicate abutment ring and said other end portion of said shaft; spring means acting on said one relatively stationary sealing ring and reacting on said one abutment collar to normally hold said one relatively stationary sealing ring in sealing contact with said one rotatable sealing ring and to permit movement of said one relatively stationary sealing ring away from said one rotatable sealing ring under the pressure created by injection of new grease into the aforesaid chamber, thereby allowing extrusion of old grease between said one bearing retainer and said cylindrical flange of said one abutment ring; and additional spring means related in the same manner with said duplicate relatively stationary sealing ring and said duplicate abutment collar, said one relatively stationary sealing ring having an outer peripheral seal in contact with the inner peripheral surface of the surrounding flange of said one abutment collar.

5. In an assembly in which a sleeve-like hub surrounds and is radially spaced from a fixed shaft; in which roller bearings are disposed within the ends of said hub and mount the latter upon said shaft; in which the ends of said shaft project beyond the ends of said hub; and in which a passage is provided for conducting grease under pressure into the chamber defined by said shaft, hub and roller bearing: one circular bearing retainer secured to one end of said hub and having an inner cylindrical surface concentric with and radially spaced from one end portion of said shaft; a duplicate bearing retainer secured to the other end of said hub and related in the same manner with the other end portion of said shaft; one abutment collar secured around said one end portion of said shaft in outwardly spaced relation with said one bearing retainer, said one abutment collar having a cylindrical flange concentric with and radially spaced from said one end portion of said shaft, said cylindrical flange extending toward said one bearing retainer and terminating in spaced relation therewith; a duplicate abutment collar secured around said other end portion of said shaft and related in the same manner with said shaft and said duplicate bearing retainer; one rotatable sealing ring with said one bearing retainer and having an outer peripheral seal contacting with said inner cylindrical surface of said one bearing retainer, the inner periphery of said one rotatable sealing ring being radially spaced from said one end portion of said shaft; a duplicate rotatable sealing ring within said duplicate bearing retainer and related in the same manner with this retainer and said other end portion of said shaft; one relatively stationary sealing ring surrounded by said cylindrical flange of said one abutment ring and in sealing contact with said one rotatable sealing ring, said one relatively stationary sealing ring having an inner peripheral seal in contact with said one end portion of said shaft; a duplicate relatively stationary sealing ring related in the same manner with said duplicate rotatable sealing ring, said duplicate abutment ring and said other end portion of said shaft; spring means acting on said one relatively stationary sealing ring and reacting on said one abutment collar to normally hold said one relatively stationary sealing ring in sealing contact with said one rotatable sealing ring and to permit movement of said one relatively stationary sealing ring away from said one rotatable sealing ring under the pressure created by injection of new grease into the aforesaid chamber, thereby allowing extrusion of old grease between said one bearing retainer and said cylindrical flange of said one abutment ring; and additional spring means related in the same manner with said duplicate relatively stationary sealing ring and said duplicate abutment collar, said abutment collar being provided with fixed circumferentially spaced pins parallel with the shaft axis and disposed within the confines of their cylindrical flanges, said relatively stationary sealing ring is provided with sockets slidably receiving the inner ends of said pins, said spring means consisting of coiled springs surrounding said pins and bearing at their opposite ends against said relatively rotatable sealing ring and the said abutment collar respectively.

6. In combination with a shaft having a rotating member mounted thereon and said rotating member having a chamber subject to lubrication; a seal assembly comprising a first seal member secured to said rotating member for rotation therewith, and a second seal member carried by said shaft, said seal members having opposed sealing surfaces extending generally normal to said shaft, an abutment collar fixed to said shaft, a plurality of equispaced circumferentially arranged pins carried by said collar, axial bores in said second seal member receiving said pins and fixing said second seal member against rotation while permitting axial movement thereof, coil springs carried by said pins and reacting on said second seal member and said collar to normally retain said seal members in sealing engagement, and said second seal member having an inner surface exposed to lubricant under pressure from within the chamber and being movable thereby to permit a cleaning of said sealing surfaces while flushing lubricant from the chamber and the relubrication of said sealing surfaces by fresh lubricant.

7. The seal assembly of claim 6 wherein said collar is cup-shaped and is telescoped over said second seal member, and said second seal member has inner and outer sealing rings engaging said collar and said shaft.

References Cited in the file of this patent

UNITED STATES PATENTS

| | | |
|---|---|---|
| 2,283,871 | Norelius | May 19, 1942 |
| 2,340,494 | Smirl | Feb. 1, 1944 |
| 2,388,570 | Philips et al. | Nov. 6, 1945 |
| 2,610,097 | Shelden | Sept. 9, 1952 |
| 2,647,025 | Deffenbaugh | July 28, 1953 |
| 2,736,624 | Schoenrock | Feb. 28, 1956 |
| 2,835,515 | Solari | May 20, 1958 |
| 2,844,393 | Jensen | July 22, 1958 |
| 2,858,176 | Thompson | Oct. 28, 1958 |
| 2,859,988 | Payne | Nov. 11, 1958 |

FOREIGN PATENTS

| | | |
|---|---|---|
| 665,696 | Great Britain | Jan. 30, 1952 |